US011297136B2

United States Patent
Higuchi et al.

(10) Patent No.: US 11,297,136 B2
(45) Date of Patent: Apr. 5, 2022

(54) MOBILITY-ORIENTED DATA REPLICATION IN A VEHICULAR MICRO CLOUD

(71) Applicant: TOYOTA JIDOSHA KABUSHIKI KAISHA, Toyota (JP)

(72) Inventors: Takamasa Higuchi, Mountain View, CA (US); Onur Altintas, Mountain View, CA (US); Kentaro Oguchi, Mountain View, CA (US)

(*) Notice: Subject to any disclaimer, the term of this patent is extended or adjusted under 35 U.S.C. 154(b) by 45 days.

(21) Appl. No.: 16/200,578

(22) Filed: Nov. 26, 2018

(65) Prior Publication Data
US 2020/0169605 A1 May 28, 2020

(51) Int. Cl.
*H04L 29/08* (2006.01)
*H04W 4/46* (2018.01)
(Continued)

(52) U.S. Cl.
CPC .......... *H04L 67/1095* (2013.01); *H04L 43/08* (2013.01); *H04L 67/12* (2013.01); *H04W 4/44* (2018.02); *H04W 4/46* (2018.02)

(58) Field of Classification Search
CPC ......... H04W 4/00; H04W 29/08; H04W 4/44; H04W 4/46; G08G 1/09; G06F 11/14; H04L 67/1095; H04L 67/12; H04L 43/08
See application file for complete search history.

(56) References Cited

U.S. PATENT DOCUMENTS 9,971,823 B2 *   5/2018  Vasanth .................. G06F 11/07
2006/0242320 A1 * 10/2006  Nettle ................. H04L 67/1019
                                                             709/245
(Continued)

FOREIGN PATENT DOCUMENTS

JP          2018-135292      *  7/2018

OTHER PUBLICATIONS

Takamasa Higuchi, Gurjashan Singh Pannu, Falko Dressler and Onur Altintas, "Content Replication in Vehicular Micro Cloud-based Data Storage: A Mobility-Aware Approach", 2018, IEEE. (Year: 2018).*

(Continued)

*Primary Examiner* — Nam T Tran
(74) *Attorney, Agent, or Firm* — Burbage Law, P.C.; Jon-Michael Burbage

(57) ABSTRACT

A vehicular micro cloud includes a set of connected vehicles that are operable to provide computational services to the set of connected vehicles. The disclosure includes embodiments for mobility-oriented data replication in the vehicular micro cloud. In some embodiments, a method includes, for each data set stored by the set of connected vehicles, determining a number of replicas to generate based on one or more mobility-based criteria. The method includes generating instances of replica data that describe the replicas. The method includes, for individual instances of replica data, determining which of the connected vehicles included in the set to use as storage locations for the individual instances of replica data based on the one or more mobility-based criteria. The method includes causing the individual instances of replica data to be stored in the storage locations. For example, the individual instances of replica data are transmitted to the storage locations.

20 Claims, 15 Drawing Sheets

(51) Int. Cl.
*H04W 4/44* (2018.01)
*H04L 12/26* (2006.01)
*H04L 67/1095* (2022.01)
*H04L 43/08* (2022.01)
*H04L 67/12* (2022.01)

(56) References Cited

U.S. PATENT DOCUMENTS

2011/0196664 A1* 8/2011 Zunger ............... H04L 67/1095
  703/21
2011/0238986 A1* 9/2011 Kherani ................. H04L 67/12
  713/168
2017/0339622 A1* 11/2017 Condeixa ............ H04L 67/1095
2020/0026619 A1* 1/2020 Kaji .................... G06F 11/1469

OTHER PUBLICATIONS

EPO, Extended European Search Report for European Patent Application No. 19210839.7, dated Mar. 13, 2020, 10 pages.
EPO, Communication Pursuant to Article 94(3) EPC for European Patent Application No. 19210839.7, dated May 20, 2021, 4 pages.

* cited by examiner

Reliability Metrics for a Single Replica

Time-to-Live (TTL): the TTL of a replica of an instance of the "bits of data 196"

- A replica of an instance of the bits of data 196 is stored at a micro cloud member $v_0$ at time $t_0$
- Vehicle $v_0$ leaves the vehicular micro cloud at time $t_0'$
- TTL of the instance of the bits of data 196 = $t_0' - t_0$
- The replica has to be handed over to another vehicular micro cloud member before TTL expires (i.e., before $v_0$ leaves the vehicular micro cloud)

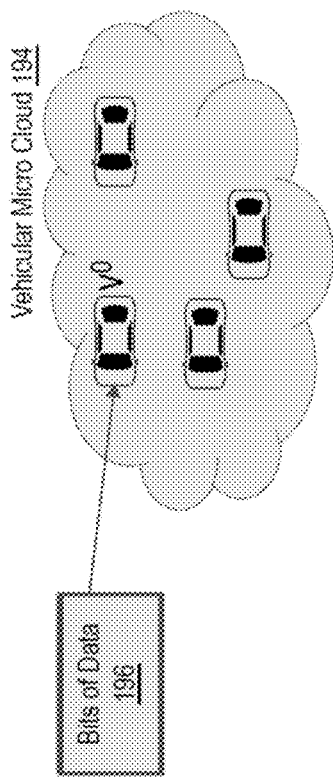

- A replica with a longer TTL may be considered more reliable because it can be kept longer in a vehicular micro cloud without performing a data handover operation, which in theory may fail due to packet loss, etc.

Figure 4

Reliability Metrics for Multiple Replicas

■ $v_0$ creates $k$ replicas of the bits of data 196, and assigns them to other micro cloud members $v_1, ..., v_k$ to improve reliability If $v_0$ fails to handover the bits of data 196, a subset or all of $v_1, ..., v_k$ take over the data management role ▫ TTL of a data content = $\max_{0 \le i \le k} (t_i' - t_i)$
  ▫ The instance of the bits of data 196 remains in the vehicular micro cloud as long as at least one replica is kept by vehicular micro cloud members $k$ is any positive whole number greater than one.

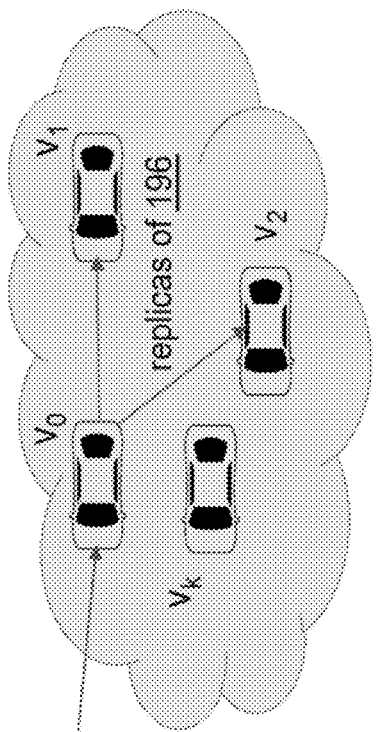

Figure 5

Motivation:
- Vehicles may fail to handover a data content to another vehicular micro cloud member before leaving the micro cloud if:
  - Wireless channel is heavily congested (→ high latency and potential packet loss)
  - Vehicle density in a micro cloud region is low (→ insufficient V2X connectivity to other vehicular micro cloud members)
  - Relative speed among vehicular micro cloud members is high (→ insufficient contact time between vehicular micro cloud members)

Example Solution:
- Vehicles monitor network and road conditions (e.g., channel load on the V2X network, speed and density of vehicular micro cloud members, etc.)
  - Speed and density can be monitored by, e.g., observing Basic Safety Messages broadcast by neighboring vehicles
- The number of replicas is determined by a function of the factors above
- In some embodiments, more replicas are generated when:
  - Network reliability is low
  - Vehicle density is low
  - Relative speed among micro cloud members is high
  - This list is non-limiting

Figure 6

Example mobility-based criteria described by the mobility criteria data 192 and used by the replica decision system 199 to select a vehicular micro cloud member to assign a replica include, but are not limited to, one or more of the following:

- Vehicle velocity: select a vehicle with the lowest velocity
- Vehicle orientation: select a vehicle moving toward the center of a micro cloud region
- Vehicle position: select a vehicle that is the closest to the center of a micro cloud region
- Distance to an existing replica: select a vehicle that has the shortest distance to a vehicle that already keeps a replica
- Dwell time: select a vehicle that joined a vehicular micro cloud the most recently

Figure 7

Example scenario with a TTL correlation issue: assign two replicas of an instance of the bits of data based on the vehicle velocity metric

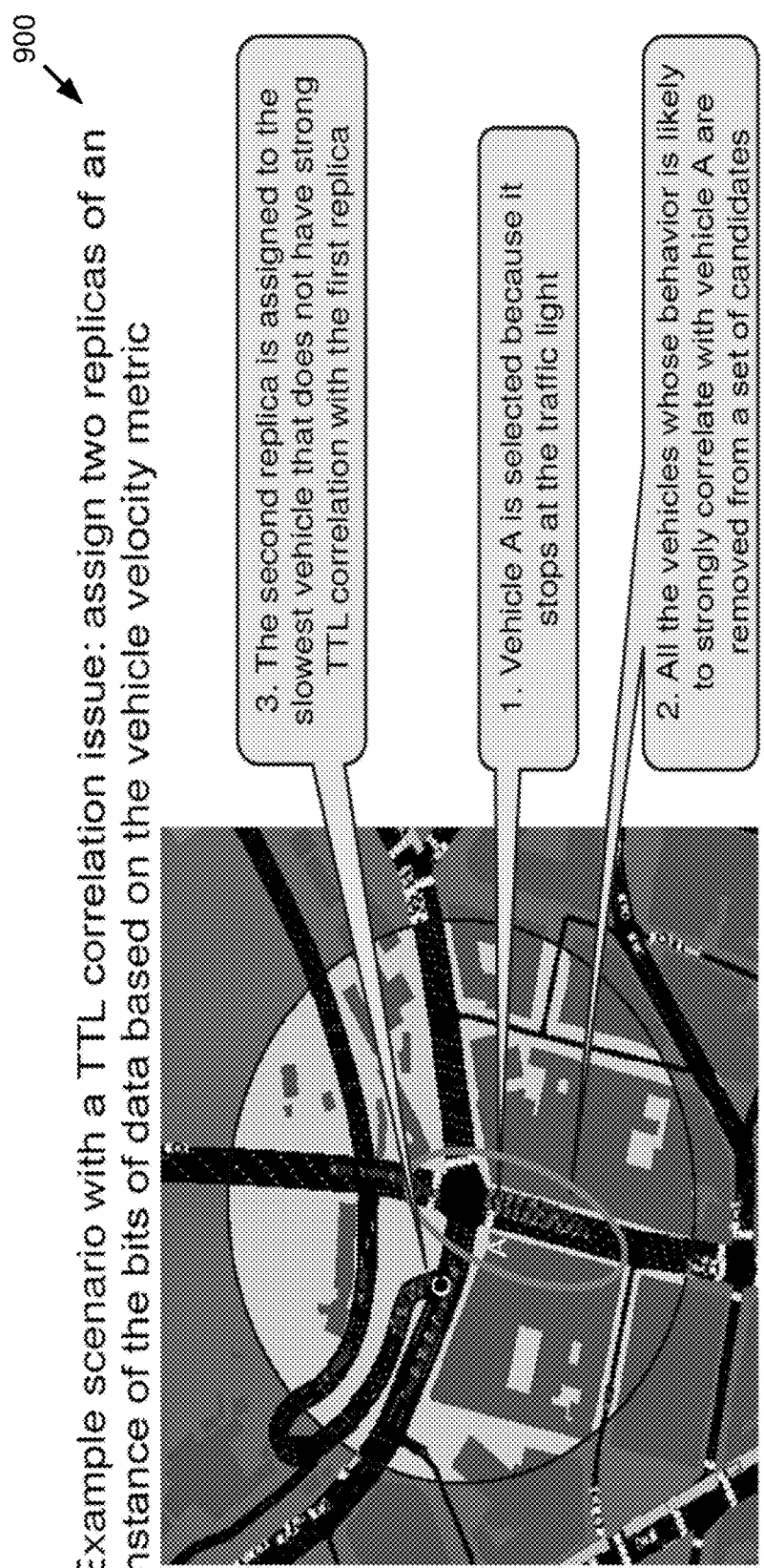

1. Vehicle A is selected because it stops at the traffic light

2. All the vehicles whose behavior is likely to strongly correlate with vehicle A are removed from a set of candidates 3. The second replica is assigned to the slowest vehicle that does not have strong TTL correlation with the first replica Behavior of a pair of vehicles can be considered correlated if they meet a set of pre-defined conditions. Example criteria include, but are not limited to the following:
- Distance between the vehicles is less than a threshold
- Difference in velocity and orientation is less than a threshold
- They are on the same road segments
- Any combination of the above listed criteria

The replication decision system can be incorporated with most of the common protocols for distributed data storage. An example use case is a primary-based protocol:

- Each data content is managed by a "primary" node for that data
  - Different primary nodes can be selected for different data contents
- The primary nodes can create replica(s) of the data and assign them to multiple other nodes as backups
  - When the primary node is down, another node keeping the replica takes over the primary role
- Write requests are handled by the primary node, and replicas are updated after the primary completes a write operation (to avoid inconsistent data updates)

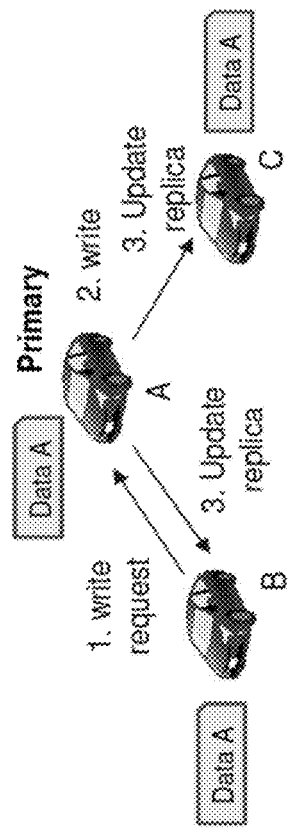

Figure 10

V2X DATA 195

- Vehicles and other client devices equipped with Dedicated Short Range Communication ("DSRC") transmit a Basic Safety Message ("BSM") at a regular interval.

- Each V2X message includes the following V2X data 195 describing one or more of the following for the vehicle that originally sent the V2X message:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 13A

V2X DATA 195

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 13B

MOBILITY-ORIENTED DATA REPLICATION IN A VEHICULAR MICRO CLOUD

BACKGROUND

The specification relates to mobility-oriented data replication in a vehicular micro cloud.

Connected vehicles form clusters of interconnected vehicles (e.g., via vehicle-to-everything, i.e., "V2X") that are located at a similar geographic location. Such clusters are known as "vehicular micro clouds." The vehicles in the cluster make available their unused computing resources to the other members of the vehicular micro cloud.

SUMMARY

Our invention is motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over vehicle-to-vehicle (V2V) networks to perform computation, data storage, and data communication tasks in an efficient way.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

A problem with vehicular micro-clouds is that it is difficult to reliably maintain data content within the vehicular micro-clouds because micro cloud members (e.g., vehicles) are in motion and leave the geographic area where the vehicular micro cloud is located, and thus must execute a handover operation to transfer the data contents they store to another micro cloud member that is still within the geographic area that is served by the vehicular micro cloud. Experience shows that this handover operation frequently fails, and the data contents are irretrievably lost. An example purpose of the embodiments described herein is to provide a mechanism for a vehicular micro cloud to reliably maintain the data content which are stored by the micro cloud members.

Described herein are embodiments of a replica decision system that solves the problem described in the preceding paragraph. In some embodiments, the replica decision system includes software installed in an onboard unit of a connected vehicle or an onboard computer of a roadside device such as a Roadside Unit (RSU). This software is referred to as a "replica decision system." The replica decision system includes code and routines that are operable, when executed by a processor, to cause the processor to execute one or more of the following steps: for each data set currently stored by a micro cloud member, determine how many replicas to generate based on one or more mobility-based criteria; for each replica, determine which micro cloud member to use for storing the replica based on the one or more mobility-based criteria; and monitor the mobility-based criteria over time and dynamically adjust (a) the number of replicas for each data set and (b) the storage location of each replica based on changes in the mobility-based criteria which occur over time.

Examples of mobility-based criteria considered by the replica decision system include one or more of the following: vehicle velocity: select a vehicle with the lowest velocity; vehicle orientation: select a vehicle moving toward the center of a micro cloud region; vehicle position: select a vehicle that is the closest to the center of a micro cloud region; distance to an existing replica: select a vehicle that has the shortest distance to a vehicle that already keeps a replica; and dwell time: select a vehicle that joined a vehicular micro cloud the most recently.

As used herein, the terms "vehicle" and "connected vehicle" may be used interchangeably.

The existing approaches for vehicle-based distributed data storage services can be classified into two categories: (1) geocast-based solutions; and (2) handover-based solutions.

The geocast-based solutions repeat geographically-scoped flooding in a region where a vehicular micro cloud is formed, so that all the micro cloud members can keep a copy of all the data contents in their data storage. Abiding geocast and regional InfoHubs by vehicles fall into this category. A drawback of this approach is inefficient utilization of data storage resources due to excessive redundancy of data caches.

The handover-based solutions assume that data contents are handed over to another alternative vehicle on a unicast basis when a vehicle is leaving the geographical region. The ad-hoc persistence protocol is a typical example of this second approach. This approach enables efficient utilization of data storage resources since only a single or a small number of micro cloud members keep the same data content. However, the data contents can be easily lost from the vehicular micro cloud if a data handover between micro cloud members fails (e.g., due to packet loss, insufficient contact time between vehicles, etc.).

The embodiments of the replica decision system described herein overcomes the deficiencies of the existing solutions summarized above. Referring again to the embodiments of the replica decision system described herein, the dynamic adjustment of the number of replicas, in combination with the correlation-aware replica assignment mechanism, allows the replica decision system to meet reliability requirements without keeping an excessive number of data replicas in a vehicular micro cloud. Thus, the replica decision system can achieve a better trade-off between the risk of losing data contents and efficient utilization of data storage resources of vehicles.

Example benefits of the replica decision system, and distinctions of the replica decision system relative to the existing solutions, are now described according to some embodiments: (1) the replica decision system dynamically adjusts the number of replicas according to road and network conditions that may affect possibility of failures of data handovers [e.g., more replicas are generated as the risk of failures increases]; (2) the replica decision system intelligently selects a set of micro cloud members that keep the replicas. By selecting a set of vehicles whose mobility behavior does not strongly correlate with each other, the replica decision system beneficially minimizes the risk of losing all the replicas at the same time.

Embodiments of the replica decision system are now described. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a vehicular micro cloud that includes a set of connected vehicles that are operable to provide computational services to the set of connected vehicles, where a connected vehicle included the set includes a processor communicatively coupled to a non-transitory memory storing computer code that is operable, when executed by the processor, to cause the processor to: for each data set stored by the set of connected vehicles, determine a number of replicas to generate based on one or more mobility-based criteria; generate instances of replica data that describe the replicas; for individual instances of replica data, determine which of the connected vehicles included in the set to use as storage locations for the individual instances of replica data based on the one or more mobility-based criteria; and cause the individual instances of replica data to be stored in the storage locations. For example, the individual instances of replica data are wirelessly transmitted to the storage location assigned to them so that these individual instances of replica data are stored by the non-transitory memories included in these storage locations (e.g., because the storage locations are connected vehicles, they include an onboard vehicle computer and the processor and non-transitory memory that is included in the onboard vehicle computer). Other embodiments of this aspect include corresponding computer systems, apparatus, and computer programs recorded on one or more computer storage devices, each configured to perform the actions of the methods.

Implementations may include one or more of the following features. The system further including additional computer code that is operable, when executed by the processor, to cause the processor to monitor the mobility-based criteria over time and dynamically adjust the number of replicas for each data set based on changes in the mobility-based criteria that occur over time. The system further including additional computer code that is operable, when executed by the processor, to cause the processor to monitor the mobility-based criteria over time and dynamically adjust the storage locations based on changes in the mobility-based criteria that occur over time. The system where the vehicular micro cloud includes a roadside unit and this roadside unit is eligible to serve as a storage location. The system where the mobility-based criteria include one or more of the following: vehicle velocity; vehicle orientation; vehicle position; distance to an existing replica; and dwell time. The system where the computational service includes one or more of the following: a processing service using un-used processing power of an onboard vehicle computer system; and a storage service using un-used storage capacity of the onboard vehicle computer system. The system where the vehicular micro cloud is not a vehicle-to-vehicle network. Implementations of the described techniques may include hardware, a method or process, or computer software on a computer-accessible medium.

One general aspect includes a method for a vehicular micro cloud that includes a set of connected vehicles that are operable to provide computational services to the set of connected vehicles, the method including: for each data set stored by the set of connected vehicles, determining a number of replicas to generate based on one or more mobility-based criteria; generating instances of replica data that describe the replicas; for individual instances of replica data, determining which of the connected vehicles included in the set to use as storage locations for the individual instances of replica data based on the one or more mobility-based criteria; and causing the individual instances of replica data to be stored in the storage locations. Other embodiments of this aspect include corresponding computer systems, apparatus, and computer programs recorded on one or more computer storage devices, each configured to perform the actions of the methods.

Implementations may include one or more of the following features. The method further including monitoring the mobility-based criteria over time and dynamically adjusting the number of replicas for each data set based on changes in the mobility-based criteria that occur over time. The method further including monitoring the mobility-based criteria over time and dynamically adjusting the storage locations based on changes in the mobility-based criteria that occur over time. The method where the vehicular micro cloud includes a roadside unit and this roadside unit is eligible to serve as a storage location. The method where the mobility-based criteria include one or more of the following: vehicle velocity; vehicle orientation; vehicle position; distance to an existing replica; and dwell time. The method where the computational service includes one or more of the following: a processing service using un-used processing power of an onboard vehicle computer system; and a storage service using un-used storage capacity of the onboard vehicle computer system. The method where the vehicular micro cloud is not a vehicle-to-vehicle network. Implementations of the described techniques may include hardware, a method or process, or computer software on a computer-accessible medium.

One general aspect includes a computer program product for a vehicular micro cloud that includes a set of connected vehicles that are operable to provide computational services to the set of connected vehicles, where the computer program product includes a non-transitory memory storing computer-executable code that, when executed by a processor, causes the processor to: for each data set stored by the set of connected vehicles, determine a number of replicas to generate based on one or more mobility-based criteria; generate instances of replica data that describe the replicas; for individual instances of replica data, determine which of the connected vehicles included in the set to use as storage locations for the individual instances of replica data based on the one or more mobility-based criteria; and cause the individual instances of replica data to be stored in the storage locations. Other embodiments of this aspect include corresponding computer systems, apparatus, and computer programs recorded on one or more computer storage devices, each configured to perform the actions of the methods.

Implementations may include one or more of the following features. The computer program product further including additional computer code that is operable, when executed by the processor, to cause the processor to monitor the mobility-based criteria over time and dynamically adjust the number of replicas for each data set based on changes in the mobility-based criteria that occur over time. The computer program product further including additional computer code that is operable, when executed by the processor, to cause the processor to monitor the mobility-based criteria over time and dynamically adjust the storage locations based on changes in the mobility-based criteria that occur over time. The computer program product where the vehicular micro cloud includes a roadside unit and this roadside unit is eligible to serve as a storage location. The computer program product where the mobility-based criteria include one or more of the following: vehicle velocity; vehicle orientation; vehicle position; distance to an existing replica; and dwell time. Implementations of the described techniques may include hardware, a method or process, or computer software on a computer-accessible medium.

This application is related to U.S. patent application Ser. No. 15/644,197 filed on Jul. 7, 2017 and entitled "Computation Service for Mobile Nodes in a Roadway Environment," the entirety of which is hereby incorporated by reference.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter, and is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

A vehicular micro cloud is not a V2X network or a V2V network. For example, neither a V2X network nor a V2V network include vehicles joined in a cluster, and a same geographic region, that make available their unused computing resources to the other members of the vehicular micro cloud.

BRIEF DESCRIPTION OF THE DRAWINGS

The disclosure is illustrated by way of example, and not by way of limitation in the figures of the accompanying drawings in which like reference numerals are used to refer to similar elements.

FIG. 4 is a block diagram illustrating reliability metrics for a single replica according to some embodiments.

FIG. 5 is a block diagram illustrating reliability metrics for multiple replicas according to some embodiments.

FIG. 6 is a block diagram illustrating an example problem and an example solution provided by the replica decision system according to some embodiments.

FIG. 7 is a block diagram illustrating mobility-based criteria according to some embodiments.

FIG. 9 is a block diagram illustrating additional information about how the replica decision system solves the example scenario depicted in FIG. 8 according to some embodiments.

FIG. 10 is a block diagram illustrating additional information about how the replica decision system is incorporated with distributed data management protocols according to some embodiments.

FIGS. 13A and 13B are block diagrams illustrating DSRC data according to some embodiments.

DETAILED DESCRIPTION

Figure 1:
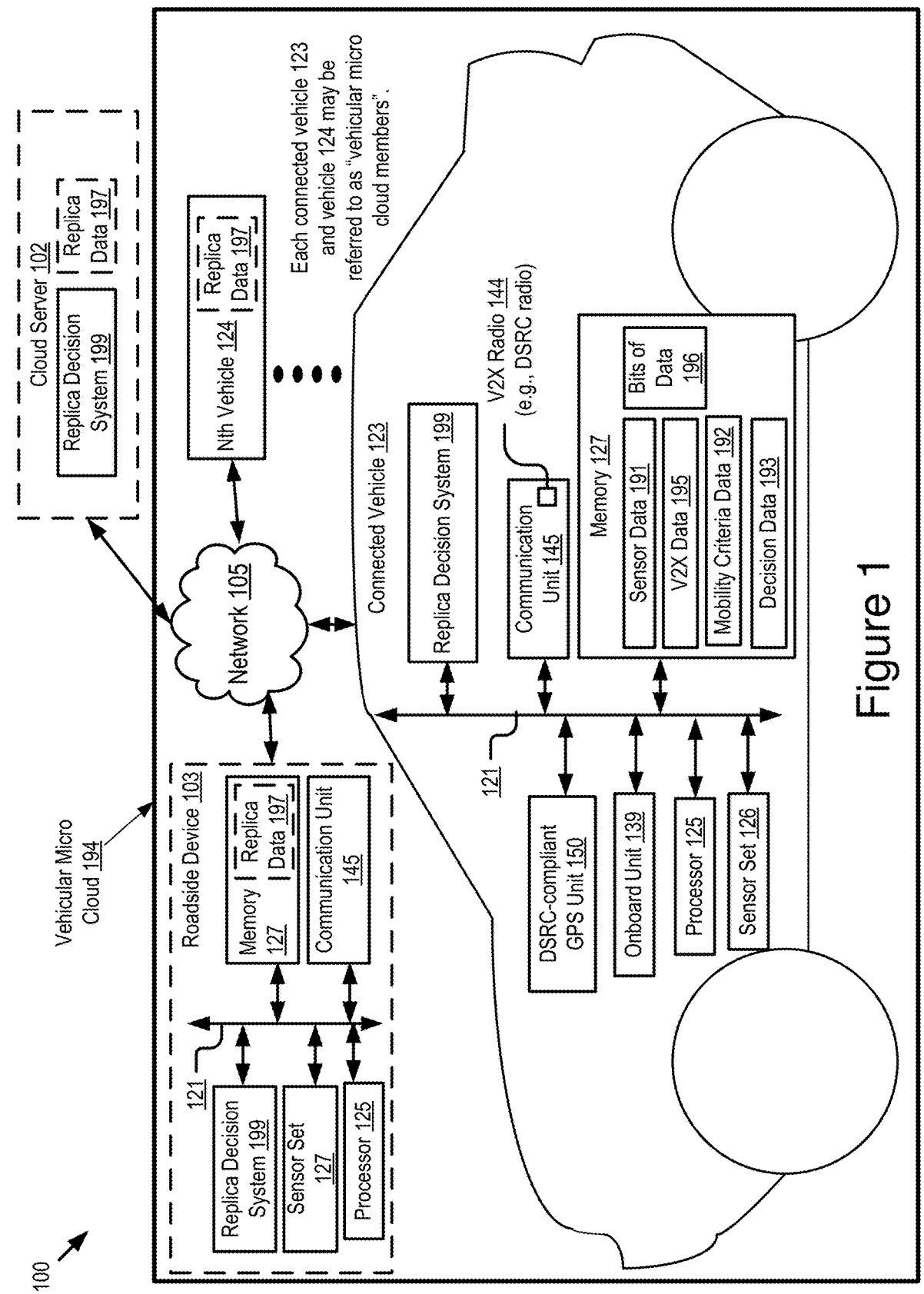
FIG. 1 is a block diagram illustrating an operating environment for a replica decision system according to some embodiments.

Our invention is motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over vehicle-to-vehicle (V2V) networks to perform computation, data storage, and data communication tasks in an efficient way.

A typical use case of vehicular micro clouds is a data storage service, where vehicles in a micro cloud collaboratively keep data contents in their on-board data storage device. It allows vehicles in and around the vehicular micro cloud to request the data contents (i.e., herein "bits of data") from micro cloud member(s) over V2X communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The existing solutions for vehicle-based distributed data storage services can be classified into two categories: (1) geocast-based solutions; and (2) handover-based solutions. Each are now discussed in more detail.

Geocast-Based Solutions

The existing geocast-based solutions repeat geographically-scoped flooding in a region where a vehicular micro cloud is formed so that all the micro cloud members can keep a copy of all the data contents in their data storage. A drawback of this approach is inefficient utilization of data storage resources due to excessive redundancy of data caches.

Handover-Based Solutions

The existing handover-based solutions assume that data contents are handed over to another alternative vehicle on a unicast basis when a vehicle is leaving the geographical region. This approach enables efficient utilization of data storage resources since only a single or a small number of micro cloud members keep the same data content. However, the data contents can be easily lost from the vehicular micro cloud if a data handover between micro cloud members fails (e.g., due to packet loss, insufficient contact time between vehicles, etc.). There is no existing handover-based solution that has been proven effective for use in mobility-based applications such as connected vehicles.

The replica decision system is differentiated from the existing solutions. For example, the replica decision is optimized for mobility. In some embodiments, the replica decision system is operable to provide its functionality in a highly dynamic vehicle environment. In some embodiments, the replica decision system is operable to cause multiple replicas of the same instance of bits of data (i.e., a single instance of data content) to be stored by multiple vehicular micro cloud members of the same vehicular micro cloud to protect against data loss that occurs during failed handover operations. For example, the replica decision system is operable to dynamically adjust a designated number of replicas stored by the vehicular micro cloud members (a single member storing, at most, one replica) based on mobility-based criteria such as those depicted in FIG. 5. In another example, the replica decision system is operable to provide an intelligent mechanism to select which vehicular micro cloud members store the replicas of the instance of bits of data.

In some embodiments, the replica decision system includes software installed in an onboard unit of a connected vehicle or an onboard computer of a roadside device such as a Roadside Unit (RSU). The replica decision system includes code and routines that are operable, when executed by a processor, to cause the processor to execute one or more of the following steps: (1) for each data set currently stored by a micro cloud member, determine how many replicas to generate based on one or more mobility-based criteria; (2) for each replica, determine which micro cloud member to use for storing the replica based on the one or more mobility-based criteria; and (3) monitor the mobility-based criteria over time and dynamically adjust (a) the number of replicas for each data set and (b) the storage location of each replica based on changes in the mobility-based criteria which occur over time. This is only a high-level description of the steps implemented by the replica decision system according to some embodiments. The replica decision system is described in more detail below according to some embodiments.

Referring now to FIG. 1, depicted is a block diagram illustrating an operating environment 100 for a replica decision system 199 according to some embodiments. The operating environment 100 is present in a geographic region so that each of the elements of the operating environment 100 is present in the same geographic region.

The operating environment 100 may include one or more of the following elements: a connected vehicle 123 (referred to herein as a "vehicle 123"); a roadside device 103; an Nth vehicle 124 (where "N" refers to any positive whole number greater than one); and a cloud server 102. Each of these elements, exclusive of the cloud server 102, is an element of a vehicular micro cloud 194. These elements of the operating environment 100 may be communicatively coupled to one another via a V2X network 105. These elements of the operating environment 100 are depicted by way of illustration. In practice, the operating environment 100 may include one or more of the elements depicted in FIG. 1. The roadside device 103 and the cloud server 102 are depicted in FIG. 1 using a dashed line to indicate that they are optional elements of the operating environment 100.

In the depicted embodiment, the connected vehicle 123, and the roadside device 103 include similar elements. For example, each of these elements of the operating environment 100 include their own bus 121, memory 127, communication unit 145, processor 125, and replica decision system 199. These elements of the connected vehicle 123 and the roadside device 103 provide the same or similar functionality relative to one another. Accordingly, these descriptions will not be repeated in this description.

In the depicted embodiment, the connected vehicle 123 and the roadside device 103 may each store similar digital data. For example, the memory 127 of the connected vehicle 123 may store the replica data 197; the memory 127 of the roadside device 103 may store any of the digital data depicted in FIG. 1 as stored by the memory 127 of the connected vehicle 123.

The vehicular micro cloud 194 may be a stationary vehicular micro cloud such as described by U.S. patent application Ser. No. 15/799,963 filed on Oct. 31, 2017 and entitled "Identifying a Geographic Location for a Stationary Micro-Vehicular Cloud," the entirety of which is herein incorporated by reference. In this patent application the vehicular micro cloud 194 is referred may be a stationary vehicular micro cloud or a mobile vehicular micro cloud. Each of the connected vehicle 123, roadside device 103 and the Nth vehicle 124 are vehicular micro cloud members because they are connected endpoints that are members of the vehicular micro cloud 194 that can access and using the unused computing resources (e.g., their unused processing power, unused data storage, etc.) of the other vehicular micro cloud members using wireless communications that are transmitted via the network 105.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and used designated unused computing resources of the other members of the vehicular micro cloud 194.

In some embodiments, a member of the vehicular micro cloud 194 includes any endpoint (e.g., the connected vehicle 123, the Nth vehicle 124, the roadside device 103, etc.) which has completed a process to join the vehicular micro cloud 194 (e.g., a handshake process with the coordinator of the vehicular micro cloud 194).

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the connected vehicle 123, as an originating endpoint for each wireless communication transmitted by the network 105. An originating endpoint is the endpoint that initiated a wireless communicating using the network 105.

In some embodiments, the connected vehicle 123 is a DSRC-equipped vehicle and the roadside device 103 is a DSRC-equipped device. For example, the connected vehicle 123 includes a DSRC-compliant GPS unit 150 and a DSRC radio (e.g., the V2X radio 144 is a DSRC radio in embodiments where the connected vehicle 123 is a DSRC-equipped vehicle) and the roadside device 103 includes a communication unit 145 having a DSRC radio similar to the one included in the connected vehicle 123. The network 105 may include a DSRC communication channel shared among the connected vehicle 123 and a second vehicle.

The vehicle 123 may include a car, a truck, a sports utility vehicle, a bus, a semi-truck, a drone, or any other roadway-based conveyance. In some embodiments, the connected vehicle 123 may include an autonomous vehicle or a semi-autonomous vehicle.

The vehicle 123 is a connected vehicle. For example, the connected vehicle 123 is communicatively coupled to the network 105 and can send and receive messages via the network 105, and this quality may make the connected vehicle 123 a "connected vehicle."

The vehicle 123 includes one or more of the following elements: a processor 125; a sensor set 126; a DSRC-compliant GPS unit 150; a communication unit 145; an onboard unit 139; a memory 127; and a replica decision system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the connected vehicle 123, multiple processors may be included in the connected vehicle 123. The processor 125 may include a graphical processing unit. Other processors, operating systems, sensors, displays, and physical configurations may be possible.

In some embodiments, the processor 125 may be an element of a processor-based computing device of the connected vehicle 123. For example, the connected vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the replica decision system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may collect the resource data. The resource data may describe, for example, the unused computing resources of the connected vehicle 123. For example, the connected vehicle 123 includes: a processor 125; a memory 127; a communication unit 145; an onboard unit 139; a sensor set 126; and a DSRC-compliant GPS unit 150. At any given time, the connected vehicle 123 is making use of some, but not all, of the processing power of the processor 125; the unused processing power of the processor 125 is an example of unused computing resources of the connected vehicle 123. At any given time, the connected vehicle 123 is making use of some, but not all, of the storage capacity of the memory 127; the unused storage capacity of the memory 127 is an example of unused computing resources of the connected vehicle 123. At any given time, the connected vehicle 123 is making use of some, but not all, of the wireless communication capacity of the communication unit 145; the unused wireless communication capacity of the communication unit 145 is an example of unused computing resources of the connected vehicle 123. At any given time, the connected vehicle 123 is making use of some, but not all, of the processing power, storage capacity or wireless communication capacity of the onboard unit 139; the processing power, storage capacity or wireless communication capacity of the onboard unit 139 are examples of unused computing resources of the connected vehicle 123. At any given time, the connected vehicle 123 is making use of some, but not all, of the sensing capacity of the sensor set 126; the unused sensing capacity of the sensor set 126 is an example of unused computing resources of the connected vehicle 123. At any given time, the connected vehicle 123 is making use of some, but not all, of the position localization capacity of the DSRC-compliant GPS unit 150; the unused position localization capacity of the DSRC-compliant GPS unit 150 is an example of unused computing resources of the connected vehicle 123. Other members of the vehicular micro cloud 194 may use these unused computer resources of the connected vehicle 123 because of their membership in the vehicular micro cloud 194.

In some embodiments, one or more of the following elements include hardware, software or a combination of hardware and software which measure the unused computing resources of the connected vehicle 123 and resource data describing the unused computing resources of the connected vehicle 123 to the replica decision system 199: the processor 125; the memory 127; the communication unit 145; the onboard unit 139; the sensor set 126; and the DSRC-compliant GPS unit 150. This hardware, software or combination of hardware and software are elements of the sensor set 126.

In some embodiments, the resource data is time-stamped. For example, the resource data describes the unused computing resources of the connected vehicle 123 at a particular point in time. In some embodiments, the resource data is geo-stamped. For example, the resource data describes the unused computing resources of the connected vehicle 123 when the connected vehicle 123 is present at a particular geographic location which is described by the GPS data.

In some embodiments, the sensor set 126 may include one or more sensors that are operable to measure the physical environment outside of the connected vehicle 123. For example, the sensor set 126 may record one or more physical characteristics of the physical environment that is proximate to the connected vehicle 123.

In some embodiments, the sensor set 126 may include one or more sensors that are operable to measure the physical environment inside a cabin of the connected vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data 191 that describes one or more locations of a device (e.g., one or more of the connected vehicle 123, the Nth vehicle 124 of the roadside device 103) at one or more different times, images or other measurements of the roadway environment and objects or other vehicles present in the roadway environment such as pedestrians, animals, traffic signs, traffic lights, pot holes, etc.

The roadway environment may include a roadway region that is proximate to the connected vehicle 123. For example, the connected vehicle 123 may be in motion on a roadway and the roadway environment may include one or more vehicles that are in front of the connected vehicle 123, behind the connected vehicle 123, beside the connected vehicle 123 or one or more car lengths away from the connected vehicle 123. The sensor data 191 may describe measurable aspects of the roadway environment.

In some embodiments, the sensor data 191 may describe an event present in the roadway environment. The event may be any roadway condition that causes roadway congestion, is an indication of roadway congestion or is a result of roadway congestion. The event may also include an opening between two objects of the roadway environment which is big enough for a vehicle (e.g., the connected vehicle 123) to enter or pass through without causing a collision or nearly causing a collision.

In some embodiments, the sensors of the sensor set 126 are operable to collect sensor data 191. The sensors of the sensor set 126 include any sensors that are necessary to measure and record the measurements described by the sensor data 191. In some embodiments, the sensor data 191 includes any measurements that are necessary to generate one or more of the V2X data 195 and the mobility criteria data 192. For example, the sensor data 191 includes any sensor measurements that are necessary to generate the mobility-based criteria that are depicted in FIG. 5.

The V2X data 195 is digital data that describes information about a vehicle (e.g., the Nth vehicle 124) that transmitted a V2X message including the V2X data 195 as its payload. Examples of the V2X data 195 are depicted in FIGS. 13A and 13B according to some embodiments. The V2X data 195 may be a means for the connected vehicle 123 to receive digital data describing the sensor measurements of other vehicles (such as the Nth vehicle 124). In some embodiments, the connected vehicle 123 generates its own V2X data 195 using its own sensor data 191 and broadcasts DSRC messages including this V2X data 195 as its payload. In this way, other vehicles (such as the Nth vehicle 124) may learn of the sensor measurements of the connected vehicle 123.

In some embodiments, the DSRC messages (or V2X messages including V2X data 195) may be treated as a form of feedback that: confirms the accuracy of a vehicle's own sensor measurements; is used to improve the accuracy of these sensor measurements; or is used as an input to a learning algorithm that improves the accuracy of a vehicle's sensor measurements over time based on the feedback received from other vehicles.

In some embodiments, the sensor data 191 describes information about the environment that includes the connected vehicle 123, including information about the connected vehicle 123 itself such as those described above in FIG. 5. In some embodiments, the replica decision system 199 includes code and routines that are operable, when executed by the processor 125 to analyze one or more of the sensor data 191 and the V2X data 195 to generate the mobility-based criteria that are described by the mobility criteria data 192.

In some embodiments, the DSRC-compliant GPS unit 150 includes any hardware and software necessary to make the connected vehicle 123 or the DSRC-compliant GPS unit 150 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 150 is operable to provide GPS data describing the location of the connected vehicle 123 with lane-level accuracy. For example, the connected vehicle 123 is traveling in a lane of a multi-lane roadway. Lane-level accuracy means that the lane of the connected vehicle 123 is described by the GPS data so accurately that the vehicle's 123 precise lane of travel may be accurately determined based on the GPS data for this vehicle 123 as provided by the DSRC-compliant GPS unit 150.

In some embodiments, the DSRC-compliant GPS unit 150 includes hardware that wirelessly communicates with a GPS satellite (or GPS server) to retrieve GPS data that describes the geographic location of the connected vehicle 123 with a precision that is compliant with the DSRC standard. The DSRC standard requires that GPS data be precise enough to infer if two vehicles (one of which is, for example, the connected vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the replica decision system 199 described herein may analyze the GPS data provided by the DSRC-compliant GPS unit 150 and determine what lane the connected vehicle 123 is traveling in based on the relative positions of two or more different vehicles (one of which is, for example, the connected vehicle 123) traveling on a roadway at the same time.

By comparison to the DSRC-compliant GPS unit 150, a conventional GPS unit which is not compliant with the DSRC standard is unable to determine the location of a vehicle 123 with lane-level accuracy. For example, a typical parking space is approximately 3 meters wide. However, a conventional GPS unit only has an accuracy of plus or minus 10 meters relative to the actual location of the connected vehicle 123. As a result, such conventional GPS units are not sufficiently accurate to enable the replica decision system 199 to determine the lane of travel of the connected vehicle 123. This measurement improves the accuracy of the mobility-based criteria used by the replica decision system 199 when providing its functionality.

In some embodiments, the memory 127 stores GPS data. The GPS data is digital data that describes a geographic location of the connected vehicle 123. In some embodiments, the GPS data also describes a time of day when the connected vehicle 123 is present at the geographic location. In some embodiments, the GPS data describes a geographic location of the connected vehicle 123 with lane-level accuracy which is compliant with the DSRC standard. In some embodiments, the GPS data is included in the sensor data 191.

The communication unit 145 transmits and receives data to and from a network 105 or to another communication channel. In some embodiments, the communication unit 145 may include a DSRC transmitter, a DSRC receiver and other hardware or software necessary to make the connected vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting Basic Safety Message ("BSM message" if singular, or "BSM messages" if plural). In some embodiments, the non-transitory memory stores a buffered version of the GPS data for the connected vehicle 123 so that the GPS data for the connected vehicle 123 is broadcast as an element of the BSM messages which are regularly broadcast by the V2X radio 144 (e.g., at an interval of once every 0.10 seconds). An example of the digital data that is included in a BSM message is depicted in FIGS. 13A and 13B. For example, in some embodiments a BSM message is a type of DSRC message.

In some embodiments, the V2X radio 144 includes any hardware or software which is necessary to make the connected vehicle 123 compliant with the DSRC standards. In some embodiments, the DSRC-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 191; the V2X data 195; bits of data 196; mobility criteria data 192; and decision data 193.

The sensor data 191 is digital data that describes the environment of the connected vehicle. The sensor data 191 describes the measurements of the sensors included in the sensor set 126. In some embodiments, the replica decision system 199 includes code and routines that are operable, when executed by the processor 125, to cause the processor 125 to: execute or activate one or more sensors of the sensor set 126 to cause to record the sensor measurements that are described by the sensor data 195; and store these sensor measurements as the sensor data 195 in the memory 127.

The V2X data 195 is digital data that describes the payload for a DSRC message or some other V2X message transmitted or received by the connected vehicle 123. Examples of the information described by the V2X data 195 according to some embodiments is depicted in FIGS. 13A and 13B. In some embodiments, the replica decision system 199 includes code and routines that are operable, when executed by the processor 125, to cause the processor 125 to: analyze the sensor data 191; generate the V2X data 195 based at least in part on the sensor data 191; and store the V2X data 195 in the memory 127 or as the payload for a DSRC message or some other type of V2X message to be transmitted by the communication unit 145.

In some embodiments, the V2X data 195 is the payload for a V2X message that is received from by the connected vehicle 123 where this V2X message was previously transmitted by one or more DSRC-enabled vehicles. For example, the V2X message is a DSRC message such as a BSM message. In this embodiment, the V2X data 195 is digital data that describes information about the DSRC-enabled vehicle that originally transmitted the V2X message including the V2X data 195. For example, the V2X data 195 describes the type of information depicted in FIGS. 13A and 13B about the DSRC-enabled vehicle that originally transmitted the V2X message including the V2X data 195.

The mobility criteria data 192 is digital data that describes one or more mobility-based criteria. Examples of the mobility-based criteria described by the mobility criteria data 192 according to some embodiments is depicted in FIG. 7. In some embodiments, the replica decision system 199 includes code and routines that are operable, when executed by the processor 125, to cause the processor 125 to: analyze the sensor data 191 (e.g., which is generated by the connected vehicle 123) and the V2X data 195 (e.g., which is generated by a DSRC-enabled vehicle that transmitted a V2X message received by the connected vehicle 123 where the V2X data 195 is the payload for the V2X message so that the connected vehicle 123 has access to the V2X data 195); determine the mobility-based criteria based at least in part on the analysis of the sensor data 191 and the V2X data 195; generate the mobility criteria data 192 that describes the mobility-based criteria; and store the mobility criteria data 192 in the memory 127.

The bits of data 196 include digital data that are stored on the connected vehicle 123 but need to be stored on one or more other endpoints of the network 105 to provide a redundancy in case data is lost when the bits of data 196 are handed over to another endpoint when the connected vehicle 123 leaves the geographic area that includes the vehicular micro cloud 194. The replica data 197 depicted as an element of the roadside device 103, the Nth vehicle 124, and the cloud server 102 is digital data that is substantially a copy of the bits of data 196. In some embodiments, the replica data 197 is an exact copy of the bits of data 196. Thus, this replica data 197 is the redundancy for the bits of data 196 stored by the connected vehicle 123.

The decision data 193 is digital data that describes a decision or determination of the replica decision system 199 based on any of the digital data described herein or any combination of the digital data described herein. For example, the decision data 193 is digital data that describes a decision or determination of the replica decision system 199 based on any of the digital data stored in the memory 127. In some embodiments, an identity of which micro cloud member to use for storing an instance of replica data 197 is described by the decision data 193.

In some embodiments, the replica decision system 199 includes software stored and executed by one or more of the connected vehicle 123, the roadside device 103, the Nth vehicle 124, and the cloud server 102. In some embodiments, the functionality of the replica decision system 199 is distributed across a plurality of devices. For example, the functionality of the replica decision system 199 is executed across a plurality of endpoints of the network 105. An endpoint of the network 105 includes, for example, the connected vehicle 123, the roadside device 103, the Nth vehicle 124, and the cloud server 102.

In some embodiments, the replica decision system 199 includes code and routines that are operable, when executed by the processor 125, to execute one or more steps of one or more of the methods 300, 1100, and 1200 described herein with reference to FIGS. 3, 11, 12A, and 12B, respectively.

In some embodiments, the replica decision system 199 includes code and routines that are operable, when executed by the processor 125, to cause the processor 125 to execute one or more of the following operations (1) through (6):

Operation (1): Cause the sensor set 126 of the connected vehicle 123 to record sensor data 191. The sensor data 191 is digital data that describes the environment of the connected vehicle 123.

Operation (2): Receive a set of V2X data 195 from one or more DSRC-enabled vehicles (e.g., one or more Nth vehicles 124). The V2X data 195 is digital data that describes information about the vehicle that transmitted the V2X data 195. Examples of the information described by the V2X data 195 according to some embodiments are depicted in FIGS. 13A and 13B.

Operation (3): Analyze one or more of the sensor data 191 and the V2X data 195 to generate the mobility criteria data 192. In some embodiments, the mobility criteria data 192 is digital data that describes mobility-based criteria that are used by the replica decision system 199 when executing one or more of operations 4, 5, 6 described immediately below. Examples of the mobility criteria data 192 according to some embodiments are depicted below in FIG. 7.

Operation (4): For each data set (i.e., an instance of "bits of data 196") stored by a micro cloud member, determine how many replicas (i.e., an instance of "replica data 197") to generate based on one or more of the mobility-based criteria described by the mobility criteria data 192. An instance of "bits of data" in FIG. 1 may be described as a "data set." An instance of "replica data 197" stored on a single micro cloud member in FIG. 1 is a single "replica." The roadside device 103, the connected vehicle 123, and the Nth vehicle 124 are each examples of a micro cloud member. In some embodiments, this operation is an example point of novelty because no existing solution for distributed storage among vehicular micro cloud members considers the mobility-based criteria when determinizing how many replicas to generate.

Operation (5): For each replica (where a "replica" is an instance of "replica data 197"), determine which micro cloud member to use for storing the replica based on the one or more mobility-based criteria. The mobility-based criteria are described by the mobility criteria data 192. The mobility-based criteria are described in more detail below with reference to FIG. 7. Operation (5) may be described as a "mobility-oriented replica assignment" because which micro cloud member to use for storing the replica is determined based on the mobility-based criteria which is itself determined by analyzing (e.g., correlating) the sensor data 191 generated by the connected vehicle 123 and the V2X data 195 generated by another vehicle which is itself capable of V2X or V2V communications. In some embodiments, the identity of the micro cloud member to use for storing the replica is described by the decision data 193.

Operation (6): Monitor the mobility-based criteria over time and dynamically adjust (a) the number of replicas for each data set and (b) the storage location of each replica based on changes in the mobility-based criteria which occur over time. For example, operations (1) through (5) may be recursively executed as more and more sensor data 191 is generated, more and more V2X data 195 is received. As more and more mobility criteria data 192 is generated and used in the operations described herein, the number of instances of replicas and their determined storage locations may change upon execution of operation (6). Operation (6) may be described as "dynamic adjustment of the number of replicas" since the number of replicas (e.g., the number of instances of replica data 197) is dynamically adjusted as more information is received or generated over time. In some embodiments, operation (6) is a point of novelty because existing solutions do not dynamically adjust the number of replicas or their storage locations based on a recursive process as is done by the replica decision according to some embodiments. In some embodiments, with regard to operation (6), the system may generate different numbers of replicas for each data content depending on importance of the data (e.g., how critical it is to lose the data).

In some embodiments, the replica decision system 199 is an element of the onboard unit 139 or some other onboard vehicle computer.

In some embodiments, the replica decision system 199 is implemented using hardware including a field-programmable gate array ("FPGA") or an application-specific integrated circuit ("ASIC"). In some other embodiments, the replica decision system 199 is implemented using a combination of hardware and software.

In some embodiments, the roadside device 103 is a device that (1) includes a communication unit 145 and a processor 125 and (2) is present in an environment (e.g., a roadway environment) with the connected vehicle 123. For example, the roadside device 103 is a roadside unit (RSU) or some other infrastructure device including the communication unit 145 and the processor 125 and present in the same environment as the connected vehicle 123.

As depicted, the roadside device 103 includes the following elements: a memory 127; a bus 121; a processor 125; a communication unit 145; and a replica decision system 199. These elements of the roadside device 103 provide similar functionality as those described above for the connected vehicle 123, and so, these descriptions will not be repeated here.

In some embodiments, the roadside device is an edge server or includes an edge server. In some embodiments, the roadside device 103 is not an element of the vehicular micro cloud 194.

The Nth vehicle 124 includes elements and functionality which are similar to those described above for the connected vehicle 123 with reference to FIG. 1, and so, those descriptions will not be repeated here. In some embodiments, the connected vehicle 123 and the Nth vehicle 124 are located in a geographic region which is managed by the roadside device 103. For example, the roadside device 103 is a stationary connected device that is responsible for establishing and maintaining stationary vehicular micro clouds at a particular geographic location or within a particular geographic region that includes the geographic locations described by the GPS data of the connected vehicle 123, the Nth vehicle 124, and the roadside device 103.

The cloud server 102 is a connected processor-based computing device that is not a member of the vehicular micro-cloud 194 and includes an instance of the replica decision system 199 and a non-transitory memory (not pictured) that stores at least one instance of replica data 197. For example, the cloud server 102 is one or more of the following: a hardware server; a personal computer; a laptop; a device such as the roadside device 103 which is not a member of the vehicular micro cloud 194; or any other processor-based connected device that is not a member of the vehicular micro-cloud 194 and includes an instance of the replica decision system 199 and a non-transitory memory that stores at least one instance of replica data 197. The cloud server 102 may include a backbone network.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the connected vehicle 123 and the Nth vehicle 124), and optionally devices such as the roadside device 103, form a cluster of interconnected vehicles that are located at a same geographic region. These connected vehicles (and optionally devices) are interconnected via Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 102. Connected vehicles (and devices such as the roadside device 103) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the replica decision system 199 includes encryption keys for encrypting wireless messages and decrypting the wireless messages described herein.

Figure 2:
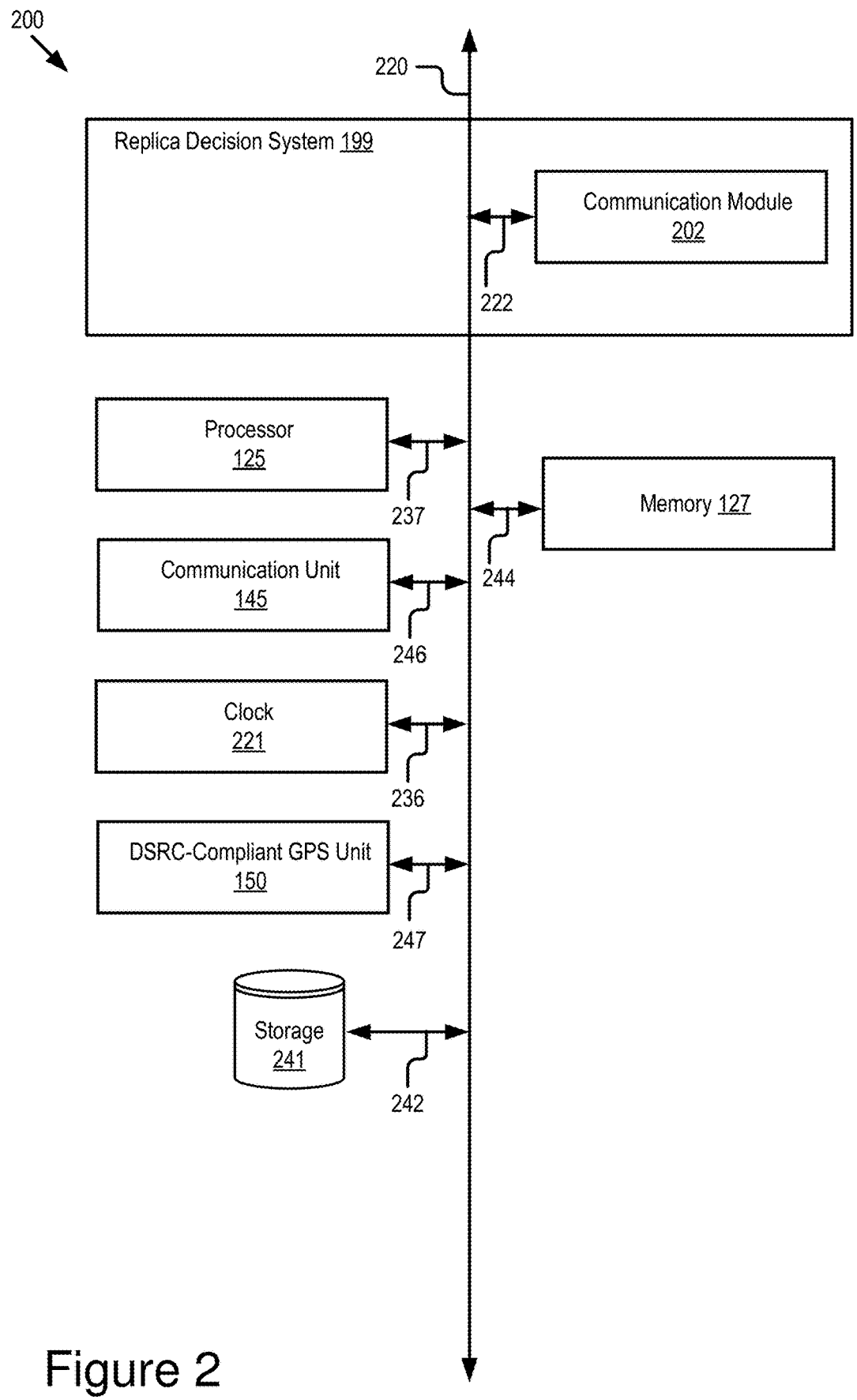
FIG. 2 is a block diagram illustrating an example computer system including a replica decision system according to some embodiments.

Referring now to FIG. 2, depicted is a block diagram illustrating an example computer system 200 including a replica decision system 199 according to some embodiments.

In some embodiments, the computer system 200 may include a special-purpose computer system that is programmed to perform one or more steps of one or more of one or more of the methods 300, 1100, and 1200 described herein with reference to FIGS. 3, 11, 12A, and 12B.

In some embodiments, the computer system 200 may include a processor-based computing device. For example, the computer system 200 may include an onboard vehicle computer system of the connected vehicle 123 or the Nth vehicle 124; the computer system 200 may also include an onboard computer system of the roadside device 103.

The computer system 200 may include one or more of the following elements according to some examples: the replica decision system 199; a processor 125; a communication unit 145; a clock 221; a DSRC-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The clock 221 is communicatively coupled to the bus 220 via a signal line 236. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the DSRC-compliant GPS unit 150; and the memory 127.

The clock 221 includes a software, hardware or a combination of hardware and software that is configured to monitor the passage of time.

In some embodiments, the clocks 221 of a plurality of computer systems 200 are synchronized so that they each monitor the passage of time in synchronization with one another. In this way, for any point in time, the clock 221 of a vehicle 123 and the clock 221 of a Nth vehicle 124 may each indicate the same time or substantially the same time.

In some embodiments, the clock 221 generates timestamp data that describes the time measured by the clock 221. The timestamp data is stored on the memory 127. In some embodiments, the timestamp data is an element of the GPS data retrieved by the DSRC-compliant GPS unit 150. In some embodiments, the timestamp data is included in the sensor data 191.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the replica decision system 199 includes code and routines that are operable, when executed by the processor 125, to cause the processor 125 to execute one or more steps of one or more of the methods 300, 1100, and 1200 described herein with reference to FIGS. 3, 11, 12A, and 12B.

In the illustrated embodiment shown in FIG. 2, the replica decision system 199 includes a communication module 202.

The communication module 202 can be software including routines for handling communications between the replica decision system 199 and other components of the computer system 200. In some embodiments, the communication module 202 can be a set of instructions executable by the processor 125 to provide the functionality described below for handling communications between the replica decision system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100 or the operating environment 101.

In some embodiments, the communication module 202 receives data from components of the replica decision system 199 and stores the data in one or more of the storage 241 and the memory 127.

In some embodiments, the communication module 202 may handle communications between components of the replica decision system 199 or the computer system 200.

Figure 3:
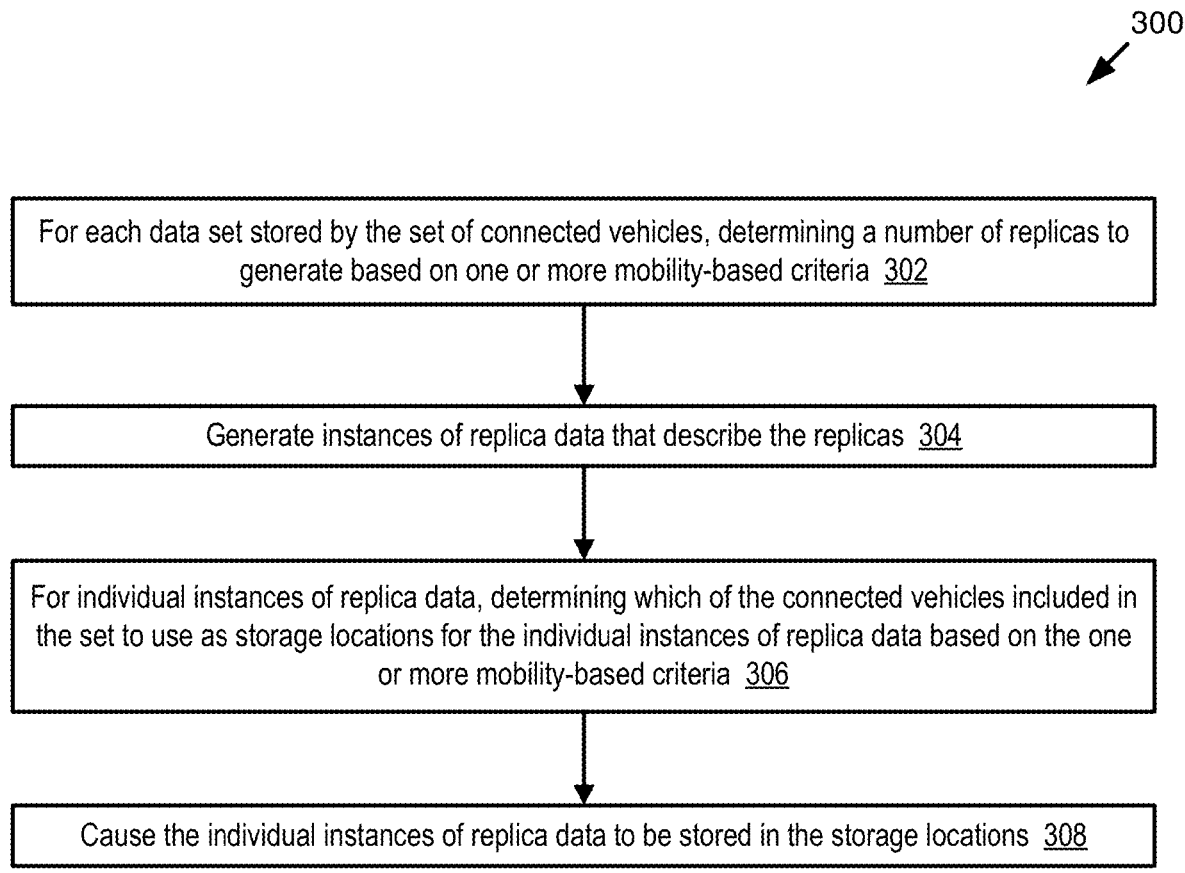
FIG. 3 is a flowchart of an example method for deciding how many replicas to generate for a data set and which storage location(s) to use for storing the replica(s) according to some embodiments.

Referring now to FIG. 3, depicted is a flowchart of an example method 300 for deciding how many replicas to generate for a data set and which storage location(s) to use for storing the replica(s) according to some embodiments. The method 300 includes steps 302, 304, 306, and 308 as depicted in FIG. 3. The steps 302, 304, 306, and 308 of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Referring now to FIG. 4, depicted is a block diagram illustrating reliability metrics 400 for a single replica according to some embodiments. In some embodiments, the replica decision system 199 includes code and routines that are operable, when executed by the processor 125, to cause the processor 125 to determine one or more of the metrics 400 depicted in FIG. 4 in scenarios where a single replica is determined to be generated by the replica decision system 199.

Referring now to FIG. 5, depicted is a block diagram illustrating reliability metrics 500 for multiple replicas according to some embodiments. In some embodiments, the replica decision system 199 includes code and routines that are operable, when executed by the processor 125, to cause the processor 125 to determine one or more of the metrics 500 depicted in FIG. 5 in scenarios where multiple replicas are determined to be generated by the replica decision system 199.

FIGS. 4 and 5 depict example overviews of the replica decision system 199 and the functionality provided by the replica decision system 199 according to some embodiments.

Referring now to FIG. 6, depicted is a block diagram illustrating an example problem and an example solution 600 provided by the replica decision system 199 according to some embodiments. FIG. 6 explains more information about how the replica decision system 199 provides dynamic adjustment of the number of replicas for each data set stored by a vehicular micro cloud 194 according to some embodiments.

Referring now to FIG. 7, depicted is a block diagram illustrating mobility-based criteria 700 according to some embodiments. The mobility-based criteria depicted in FIG. 7 are intended to be illustrative and non-limiting.

The connected vehicle 123 includes a sensor set 126. The sensor set 126 records sensor data 191. The sensor data 191 describes information about the environment that includes the connected vehicle 123, including information about the connected vehicle 123 itself. In some embodiments, the replica decision system 199 includes code and routines that are operable to analyze one or more of the sensor data 191 and the V2X data 195 to generate the mobility-based criteria that are described by the mobility criteria data 192.

Figure 8:
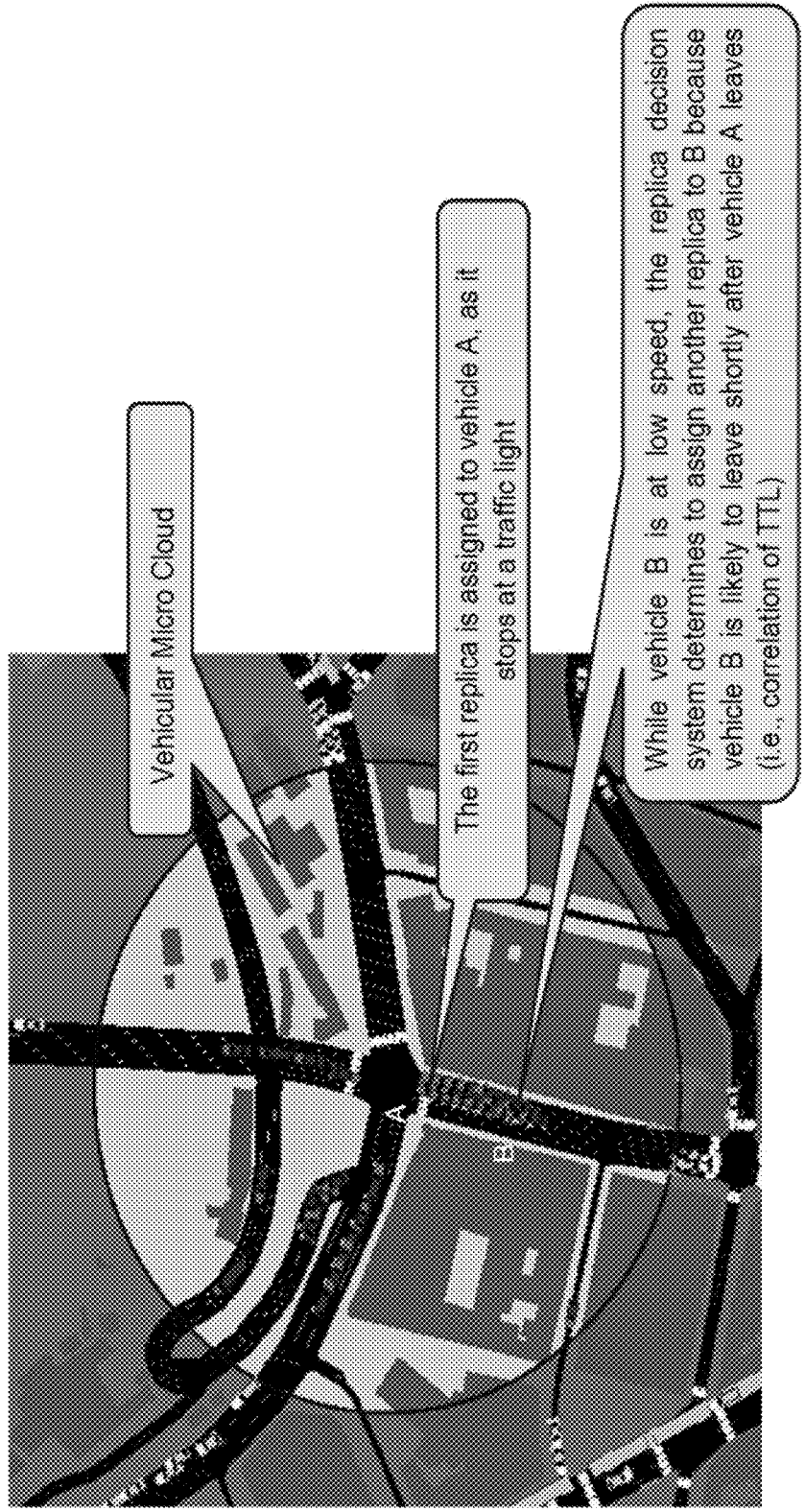
FIG. 8 is a block diagram illustrating an example scenario including a time to live (TTL) correlation issue according to some embodiments.

In some embodiments, the replica decision system 199 analyzes the mobility criteria data 192 and determines, based on this analysis, correlations or metrics that affect a number of replicas that should be generated and where these replicas should be stored. The replica decision system 199 then determines how many replicas to generate and where these replicas should be stored based on these correlations or metrics which are determinable from the mobility criteria data 192. FIGS. 8 and 9 describe an example of the replica decision system 199 determining correlations or metrics which, in turn, affect how many replicas the replica decision system 199 determines to generate and where these replicas should be stored.

A vehicular micro cloud 194 may be limited to a specific area or region which is formed by a boundary. This area/region may be described as a "micro cloud region."

In some embodiments, the mobility-based criteria include one or more of the following: vehicle velocity; vehicle orientation; vehicle position; a vehicle's distance to an existing replica; and a vehicle's dwell time. These criteria are illustrative and not intended to be limiting. For example, any of the data described by the sensor data 191 or the V2X data 195, or determinable by the information described by this data, may be included in the mobility-based criteria so long as it is related and relevant to mobility. For example, a vehicle's heading may also be included in the mobility-based criteria since the vehicle heading, when combined with the vehicle's velocity and position within the vehicular micro cloud, affect how long the vehicle will be located within the vehicular micro cloud.

For example, the determination of which member of a vehicular micro cloud 194 should store a particular replica may be affected by a heading and a speed of particular members relative to the boundary of the vehicular micro cloud 194, the crossing of which would trigger a handover operation. In general, members that will be located within the vehicular micro cloud longer relative to the other members are preferred to be the storage location of replicas by the replica decision system 199 since these replicas will "live" longer and provide more value. For example, members that are located toward the center of the region/area of the vehicular micro cloud 194 are preferred to be the storage location of replicas by the replica decision system 199 relative to members that are located more closely to the perimeter/boundary of the region/area of the vehicular micro cloud 194. Mobility-based criteria such as vehicle velocity, orientation, position/location, etc. affect this determination when it is considered that the vehicles within the vehicular micro cloud may generally be in motion as they may be traveling at roadway speeds. This example may be read as assuming that the vehicular micro cloud 194 is a static vehicular micro cloud. However, this example is not intended to be limiting as the functionality of the replica decision system 199 is not limited to static vehicular micro clouds.

FIGS. 8 and 9 describe another example in which a replica's time to "live" may be calculated and considered by the replica decision system 199.

Referring now to FIGS. 8 and 9 collectively, FIG. 8 is a block diagram 800 illustrating an example scenario including a time to live (TTL) correlation issue according to some embodiments. This example scenario is intended to be illustrative and non-limiting of the functionality provided by the replica decision system according to some embodiments. FIG. 9 depicts a block diagram 900 illustrating additional information about how the replica decision system solves the example scenario depicted in FIG. 8 according to some embodiments. This additional information is intended to be illustrative and non-limiting of the functionality provided by the replica decision system 199 according to some embodiments.

FIGS. 8 and 9 depict non-limiting examples of correlation-aware replica assignment which was briefly described above with reference to FIG. 1 and "operation (5)" which is expected by the replica decision system 199 in some embodiments. Specifically, FIGS. 8 and 9 demonstrate examples where the replica decision system 199 provides a mobility-oriented replica assignment based on a TTL metric which is determinable by the replica decision system 199 based on an analysis of the mobility-based criteria, an example of which is depicted in FIG. 7.

Referring now to FIG. 10, depicted is a block diagram illustrating additional information 1000 about how the replica decision system is incorporated with distributed data management protocols according to some embodiments.

In some embodiments, FIG. 10 depicts the primary-based protocol as an example of a protocol that is compatible with the functionality provided by the replica decision system 199, but other protocols for distributed data management are also compatible with the functionality of the replica decision system 199. Accordingly, this example is not intended to be limiting.

Figure 11:
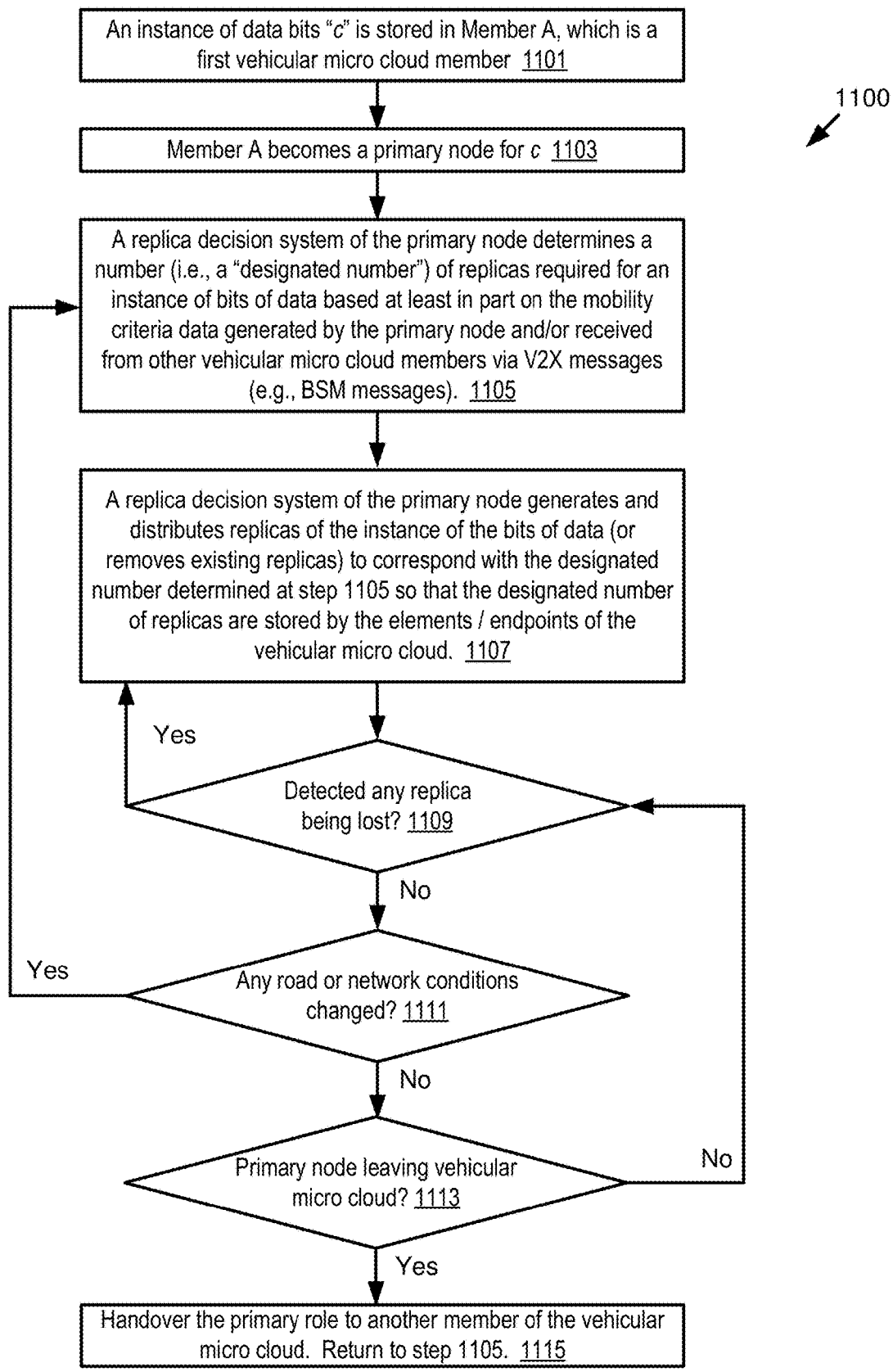
FIG. 11 is a flowchart of an example method for a handover function according to some embodiments.

Referring now to FIG. 11, depicted is a flowchart of an example method 1100 for a handover function according to some embodiments. One or more steps of the method 1100 may be executed by the computer system 200 described above with reference to FIG. 2. The method 1100 includes steps 1101, 1103, 1105, 1107, 1109, 1111, 1113, and 1115 as depicted in FIG. 11. The steps 1101, 1103, 1105, 1107, 1109, 1111, 1113, and 1115 of the method 1100 may be executed in any order, and not necessarily those depicted in FIG. 11. In some embodiments, one or more of the steps are skipped or modified in ways that are described herein or known or otherwise determinable by those having ordinary skill in the art of vehicular micro clouds.

Figure 12A:
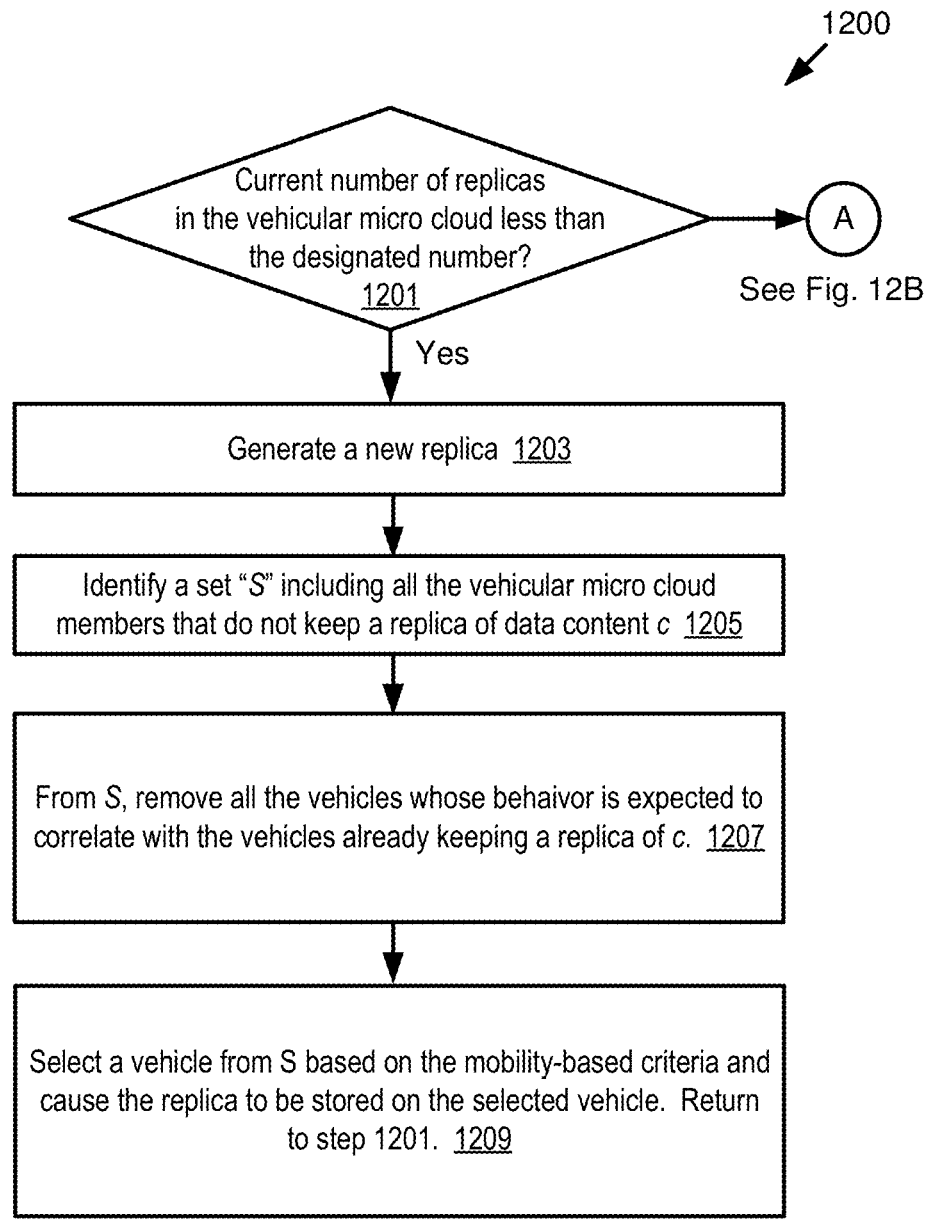
FIGS. 12A and 12B are a flowchart of an example method for deciding how many replicas to generate for a data set and which storage location(s) to use for storing the replica(s) according to some embodiments.
Figure 12B:
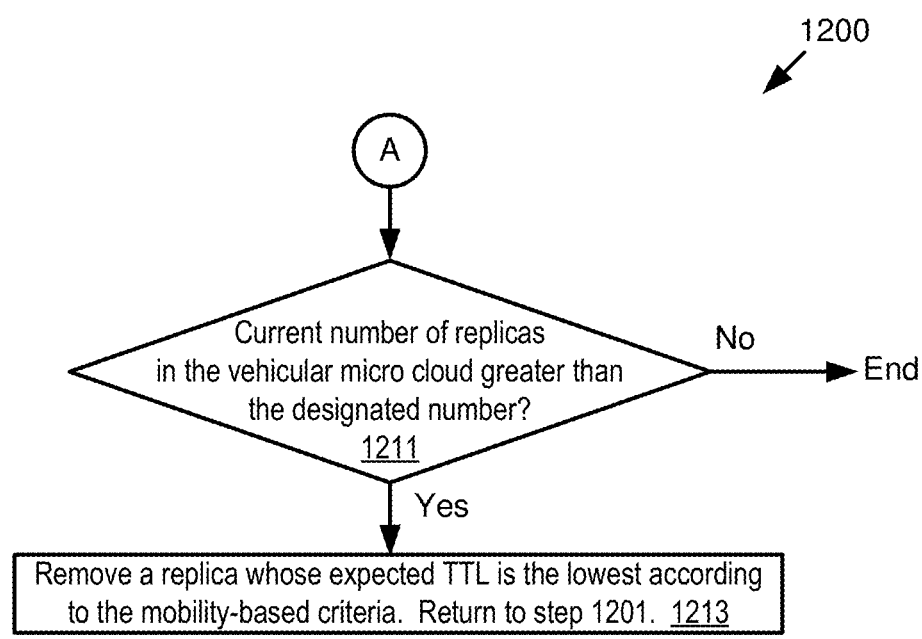

Referring now to FIGS. 12A and 12B, depicted is a flowchart of an example method 1200 for deciding how many replicas to generate for a data set and which storage location(s) to use for storing the replica(s) according to some embodiments. One or more steps of the method 1200 may be executed by the computer system 200 described above with reference to FIG. 2. The method 1200 includes steps 1201, 1203, 1205, 1207, 1209, 1211, and 1213 as depicted in FIG. 12. The steps 1201, 1203, 1205, 1207, 1209, 1211, and 1213 of the method 1200 may be executed in any order, and not necessarily those depicted in FIG. 12. In some embodiments, one or more of the steps are skipped or modified in ways that are described herein or known or otherwise determinable by those having ordinary skill in the art of vehicular micro clouds.

Referring now to FIGS. 13A and 13B, depicted are block diagrams illustrating V2X data 195 according to some embodiments.

The V2X data 195 may be a payload for a DSRC message, a mmWave message, or any other type of V2X message. The DSRC message may include one or more of a conventional DSRC message, a DSRC probe, or a BSM message.

The regular interval for transmitting V2X messages is user configurable. In some implementations, a default setting for this interval is transmitting the V2X message is every 0.10 seconds or substantially every 0.10 seconds. A V2X message is broadcasted over the 5.9 GHz DSRC band. In some embodiments, the V2X radio of the communication unit includes seven bands for transmitting and receiving V2X messages, with one of these bands being reserved exclusively for transmitting and receiving V2X messages.

The range for transmitting DSRC messages such as BSM messages is substantially 1,000 meters. In some implementations, DSRC range is a range of substantially 100 meters to substantially 1,000 meters.

Referring now to FIG. 13B, depicted is a block diagram illustrating V2X data 195 according to some embodiments. In some embodiments, each V2X message includes all of the information depicted in FIG. 7 for the V2X data 195 and no other information.

A V2X message may include two parts. These two parts may include different V2X data 195 as shown in FIG. 13B.

Part 1 of the V2X data 195 describes the following: vehicle position; vehicle heading; vehicle speed; vehicle acceleration; vehicle steering wheel angle; and vehicle size.

Part 2 of the V2X data 195 includes a variable set of data elements drawn from a list of optional elements. Some of the V2X data 195 included in Part 2 of the V2X message are selected based on event triggers, e.g., anti-locking brake system ("ABS") being activated may trigger V2X data 195 relevant to the ABS system of the vehicle.

In some implementations, some of the elements of Part 2 are transmitted less frequently in order to conserve bandwidth.

In some implementations, the V2X data 195 included in a V2X message includes current snapshots (i.e., photographs) of a vehicle traveling along a roadway system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system comprising:
a first vehicle in a set of vehicles that is part of a vehicular micro cloud that provides a service to the set of vehicles, the first vehicle including a processor communicatively coupled to a non-transitory memory storing computer code that is operable, when executed by the processor, to cause the processor to:
for each data set stored by the set of vehicles, determine a number of replicas to generate based on one or more mobility-based criteria, wherein the number of replicas increases in response to a road condition or a network condition increasing a risk of failure;
generate instances of replica data that describe the replicas;
for individual instances of replica data, determine which of the vehicles included in the set to use as storage locations for the individual instances of replica data based on the one or more mobility-based criteria and which of the set of vehicles most recently joined the vehicular micro cloud;
cause the individual instances of replica data to be stored in the storage locations;
identify a second vehicle that does not keep a replica and that has behavior that correlates with the set of vehicles already keeping the replica; and
remove the second vehicle from the vehicular micro cloud.

2. The system of claim 1, wherein the number of replicas includes different numbers of replica data based on an importance of the replica data.

3. The system of claim 1, further comprising additional computer code that is operable, when executed by the processor, to cause the processor to select the set of vehicles based on the vehicles in the set of vehicles having different mobility behavior, thereby decreasing a likelihood that the set of vehicles will leave the vehicular micro cloud at a same time.

4. The system of claim 1, wherein determining the number of replicas is further based on network reliability, vehicle density, and a relative speed among the set of vehicles.

5. The system of claim 1, wherein the mobility-based criteria further include one or more of the following: selecting one of the set of vehicles based on a lowest velocity, selecting one of the set of vehicles based on being closest to a center of the vehicular micro cloud, or selecting one of the set of vehicles that has a shortest distance to another vehicle that already keeps the replica.

6. The system of claim 1, further comprising additional computer code that is operable, when executed by the processor, to cause the processor to:
responsive to removing the second vehicle from the vehicular micro cloud, select a third vehicle from the set based on the third vehicle having behavior that does not correlate with the set of vehicles already keeping the replica; and
cause the replica to be stored on the third vehicle.

7. The system of claim 1, wherein dynamically adjusting the number of replicas includes generating more replicas as a risk of failures of data handovers increases.

8. A method for a vehicular micro cloud that includes a set of vehicles that are operable to provide a service to the set of vehicles, the method comprising:
for each data set stored by the set of vehicles, determining a number of replicas to generate based on one or more mobility-based criteria, wherein the number of replicas increases in response to a road condition or a network condition increasing a risk of failure;
generating instances of replica data that describe the replicas;
for individual instances of replica data, determining which of the vehicles included in the set to use as storage locations for the individual instances of replica data based on the one or more mobility-based criteria and which of the set of vehicles most recently joined the vehicular micro cloud;
causing the individual instances of replica data to be stored in the storage locations;
identifying a first vehicle from the set of vehicles that does not keep a replica and that has behavior that correlates with the set of vehicles already keeping the replica; and
removing the first vehicle from the vehicular micro cloud.

9. The method of claim 8, wherein the number of replicas includes different numbers of replica data based on an importance of the replica data.

10. The method of claim 8, further comprising monitoring the mobility-based criteria over time and dynamically adjusting the storage locations based on changes in the mobility-based criteria that occur over time.

11. The method of claim 8, wherein the vehicular micro cloud includes a roadside unit and this roadside unit is eligible to serve as a storage location.

12. The method of claim 8, wherein the mobility-based criteria include one or more of the following: selecting one of the set of vehicles based on a lowest velocity, selecting one of the set of vehicles based on being closest to a center of the vehicular micro cloud, or selecting one of the set of vehicles that has a shortest distance to another vehicle that already keeps the replica.

13. The method of claim 8, wherein the service is a computational service that includes one or more of the following: a processing service using un-used processing power of an onboard vehicle computer system; or a storage service using un-used storage capacity of the onboard vehicle computer system.

14. The method of claim 8, wherein dynamically adjusting the number of replicas includes generating more replicas as a risk of failures of data handovers increases.

15. A computer program product for a first vehicle in a set of vehicles that is part of a vehicular micro cloud that provides a service to the set of vehicles, wherein the computer program product comprises a non-transitory memory storing computer-executable code that, when executed by a processor, causes the processor to:
for each data set stored by the set of vehicles, determine a number of replicas to generate based on one or more mobility-based criteria, wherein the number of replicas increases in response to a road condition or a network condition increasing a risk of failure;
generate instances of replica data that describe the replicas;
for individual instances of replica data, determine which of the vehicles included in the set to use as storage locations for the individual instances of replica data based on the one or more mobility-based criteria and which of the set of vehicles most recently joined the vehicular micro cloud;

cause the individual instances of replica data to be stored in the storage locations;
identify a second vehicle that does not keep a replica and that has behavior that correlates with the set of vehicles already keeping the replica; and
remove the second vehicle from the vehicular micro cloud.

16. The computer program product of claim 15, wherein the number of replicas includes different numbers of replica data based on an importance of the replica data.

17. The computer program product of claim 15, further comprising additional computer code that is operable, when executed by the processor, to cause the processor to select the set of vehicles based on the vehicles in the set of vehicles having different mobility behavior, thereby decreasing a likelihood that the set of vehicles will leave the vehicular micro cloud at a same time.

18. The computer program product of claim 15, wherein determining the number of replicas is further based on network reliability, vehicle density, and a relative speed among the set of vehicles.

19. The computer program product of claim 15, further comprising additional computer code that is operable, when executed by the processor, to:
determine that the replica was lost; and
responsive to determining that the replica was lost, generating a new replica.

20. The computer program product of claim 15, wherein the service is a computational service that includes one or more of the following: a processing service using un-used processing power of an onboard vehicle computer system; or a storage service using un-used storage capacity of the onboard vehicle computer system.

* * * * *